US009477620B2

(12) United States Patent
Kim et al.

(10) Patent No.: US 9,477,620 B2
(45) Date of Patent: Oct. 25, 2016

(54) STORAGE SYSTEM FOR CHANGING A DATA TRANSFER SPEED AND A METHOD OF CHANGING THE DATA TRANSFER SPEED THEREOF

(71) Applicant: SAMSUNG ELECTRONICS CO., LTD., Suwon-si, Gyeonggi-do (KR)

(72) Inventors: Dong-Min Kim, Hwaseong-si (KR); Sangyoon Oh, Suwon-si (KR); HyunSoo Cho, Bucheon-si (KR); Jeong Hur, Gwangju (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 2 days.

(21) Appl. No.: 14/325,732

(22) Filed: Jul. 8, 2014

(65) Prior Publication Data

US 2015/0032913 A1 Jan. 29, 2015

(30) Foreign Application Priority Data

Jul. 25, 2013 (KR) ........................ 10-2013-0088109

(51) Int. Cl.
*G06F 13/28* (2006.01)
*G06F 3/00* (2006.01)
*G06F 13/42* (2006.01)

(52) U.S. Cl.
CPC ........... *G06F 13/28* (2013.01); *G06F 13/4291* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | | |
|---|---|---|---|---|
| 5,652,916 | A * | 7/1997 | Murakami | G06F 9/4881 710/52 |
| 6,275,896 | B1 * | 8/2001 | Kojima | G06F 5/06 709/232 |
| 7,325,104 | B2 | 1/2008 | Satori et al. | |
| 7,634,585 | B2 | 12/2009 | Conley et al. | |
| 8,370,857 | B2 | 2/2013 | Kamii et al. | |
| 2005/0185463 | A1 | 8/2005 | Kanamori et al. | |
| 2006/0026315 | A1 | 2/2006 | Hong et al. | |
| 2006/0031600 | A1 * | 2/2006 | Ellis | G06F 13/28 710/22 |
| 2006/0168310 | A1 * | 7/2006 | Koyanagi | H04L 47/14 709/233 |
| 2006/0224785 | A1 * | 10/2006 | Nakashima | G06F 13/126 710/48 |
| 2006/0294267 | A1 | 12/2006 | Lenaerts | |
| 2007/0104055 | A1 | 5/2007 | Lenaerts | |
| 2009/0249096 | A1 | 10/2009 | Conner et al. | |
| 2010/0274953 | A1 * | 10/2010 | Lee | G06F 1/266 711/103 |
| 2012/0166681 | A1 | 6/2012 | Suzuki | |
| 2013/0111050 | A1 * | 5/2013 | Ziegler | H04L 12/4633 709/230 |
| 2013/0132648 | A1 | 5/2013 | Choi et al. | |

FOREIGN PATENT DOCUMENTS

| | | |
|---|---|---|
| JP | 2003-256355 | 9/2003 |
| JP | 2012-234428 | 11/2012 |
| JP | 2012-252485 | 12/2012 |
| KR | 100952947 | 4/2010 |

* cited by examiner

*Primary Examiner* — David E Martinez

(74) *Attorney, Agent, or Firm* — F. Chau & Associates, LLC

(57) ABSTRACT

A storage device of a storage system includes a device Direct Memory Access (DMA) configured to calculate a data transfer amount based on size information of data provided to a DMA queue; a command manager configured to receive the data transfer amount from the device DMA and to calculate a transfer speed using a speed mode table; and a device interface configured to transfer the transfer speed to a host.

19 Claims, 12 Drawing Sheets

2238

| Mode | Speed |
|---|---|
| Speed Mode (A) | 1.5 Gbps |
| Speed Mode (B) | 3 Gbps |
| Speed Mode (C) | 6 Gbps |

(Speed Mode Table)

STORAGE SYSTEM FOR CHANGING A DATA TRANSFER SPEED AND A METHOD OF CHANGING THE DATA TRANSFER SPEED THEREOF

CROSS-REFERENCE TO RELATED APPLICATION

This U.S. non-provisional patent application claims priority under 35 U.S.C. §119 to Korean Patent Application No. 10-2013-0088109 filed Jul. 25, 2013, in the Korean Intellectual Property Office, the disclosure of which is incorporated by reference herein in its entirety.

TECHNICAL FIELD

The inventive concept relates to a storage system, and more particularly, to a storage system capable of changing a data transfer speed and a method of changing a data transfer speed of the storage system.

DISCUSSION OF THE RELATED ART

A storage system may consist of a host and a storage device. The host and the storage device may be interconnected through various interfaces such as a Universal Flash Storage (UFS) interface, a Serial Advanced Technology Attachment (SATA) interface, a Small Computer Small Interface (SCSI), a Serial Attached SCSI (SAS), an embedded Multi Media Card (eMMC) interface, etc. When the storage system is used as a mobile device, power consumption may be reduced.

A trade-off may exist between performance and power consumption of the storage system. For example, in the event that a data transfer speed is fast, the performance is improved and the power consumption is increased. In the event that the data transfer speed is slow, the performance is lowered and the power consumption is decreased.

A storage system may send data at a maximum speed to satisfy demands of the host and the storage device. In this case, power may be unnecessarily consumed.

SUMMARY

An exemplary embodiment of the inventive concept provides a storage device of a storage system which comprises a device Direct Memory Access (DMA) configured to calculate a data transfer amount based on size information of data provided to a DMA queue; a command manager configured to receive the data transfer amount from the device DMA and to calculate a transfer speed using a speed mode table; and a device interface configured to transfer the transfer speed to a host.

In an exemplary embodiment of the inventive concept, the device DMA calculates an amount of data received using size information of data received through the device interface and calculates an amount of data to be transmitted using size information of data to be transmitted to the host through the device interface.

The device DMA comprises a reception DMA queue of the DMA queue configured to store the size information of data received through the device interface; a transmission DMA queue of the DMA queue configured to the store size information of data to be transmitted to the host through the device interface; and a DMA manager configured to calculate an amount of data stored in the reception DMA queue, to calculate an amount of data stored in the transmission DMA queue, and to provide the command manager the amount of data received and the amount of data to be transmitted as the data transfer amount.

In an exemplary embodiment of the inventive concept, the host changes speed modes of an interface of the host and an interface of the storage device in response to the transfer speed.

In an exemplary embodiment of the inventive concept, the command manager changes a speed mode based on a margin of the speed mode when the data transfer amount exceeds the margin. The command manager changes a speed mode when reaching a predetermined speed mode.

A Universal Flash Storage (UFS) system according to an exemplary embodiment of the inventive concept is provided which comprises a UFS device including a flash memory; and a UFS host connected to the UFS device through an interface and configured to change a data transfer speed using a transfer speed provided from the UFS device, wherein the UFS device calculates the transfer speed based on a data transfer amount.

In an exemplary embodiment of the inventive concept, the UFS device comprises a device DMA configured to calculate the data transfer amount based on size information of data; and a command manager configured to receive the data transfer amount from the device DMA and to calculate the transfer speed using a speed mode table.

In an exemplary embodiment of the inventive concept, the interface includes a device interface and the device DMA calculates an amount of data received using size information of data received through the device interface and calculates an amount of data to be transmitted using size information of data to be transmitted to the UFS host through the device interface. The device DMA comprises a reception DMA queue configured to store the size information of data received through the device interface; a transmission DMA queue configured to store the size information of data to be transmitted to the UFS host through the device interface; and a DMA manager configured to calculate an amount of data stored in the reception DMA queue, to calculate an amount of data stored in the transmission DMA queue, and to provide the command manager the amount of data received and the amount of data to be transmitted as the data transfer mount.

In an exemplary embodiment of the inventive concept, the command manager changes a speed mode based on a margin of the speed mode when the data transfer amount exceeds the margin.

In an exemplary embodiment of the inventive concept, the command manager changes a speed mode when reaching a predetermined speed mode.

In an exemplary embodiment of the inventive concept, the interface includes a host interface and a device interface and the UFS host changes speed modes of the host interface and the device interface in response to the transfer speed. The UFS device provides the UFS host with the transfer speed using a Ready_To_(RTT) UFS Protocol Information Unit (UPIU), a DATA IN UPIU or a RESPONSE UPIU.

The UFS host comprises a host DMA configured to receive the RTT UPIU, DATA IN UPIU or RESPONSE UPIU through the host interface; and a command manager configured to parse the RTT UPIU, DATA IN UPIU or RESPONSE UPIU provided from the host DMA to determine the transfer speed.

The UFS host further comprises a device driver configured to issue a speed mode change command in response to the transfer speed provided from the command manager; and a host controller configured to change speed modes of the host and device interfaces in response to the speed mode change command.

An exemplary embodiment of the inventive concept provides a method of changing a data transfer speed of a storage system that includes a host and a storage device, the method comprising calculating a data transfer amount based on data size information in the storage device; receiving the data transfer amount to calculate a transfer speed using a speed mode table; providing the transfer speed to the host from the storage device; requesting a device driver to change a data transfer speed of an interface to the transfer speed provided from the storage device; and changing the data transfer speed of the interface in response to a transfer mode change command of the device driver.

In an exemplary embodiment of the inventive concept, calculating the data transfer amount comprises calculating an amount of data received and an amount of data to be transmitted. Changing the data transfer speed of the interface comprises changing a speed mode based on a margin of the speed mode when the data transfer amount exceeds the margin. Alternatively, changing the data transfer speed of the interface comprises changing a speed mode when reaching a predetermined speed mode.

An exemplary embodiment of the inventive concept provides a storage device including a first module configured to determine a data transmission amount based on data received at the storage device and data to be transmitted from the storage device; and a second module configured to determine a data transfer speed mode by using the data transmission amount, wherein data transferred to/from the storage device in a first data transfer speed mode is less than data transferred to/from the storage device in a second data transfer speed mode.

The storage device further includes a data transfer speed mode table.

The storage device further includes a device interface communicably coupled with the first module.

BRIEF DESCRIPTION OF THE DRAWINGS

The above and other features of the inventive concept will become more apparent by describing in detail exemplary embodiments thereof with reference to the attached drawings, in which.

DETAILED DESCRIPTION OF THE EMBODIMENTS

Figure 1:
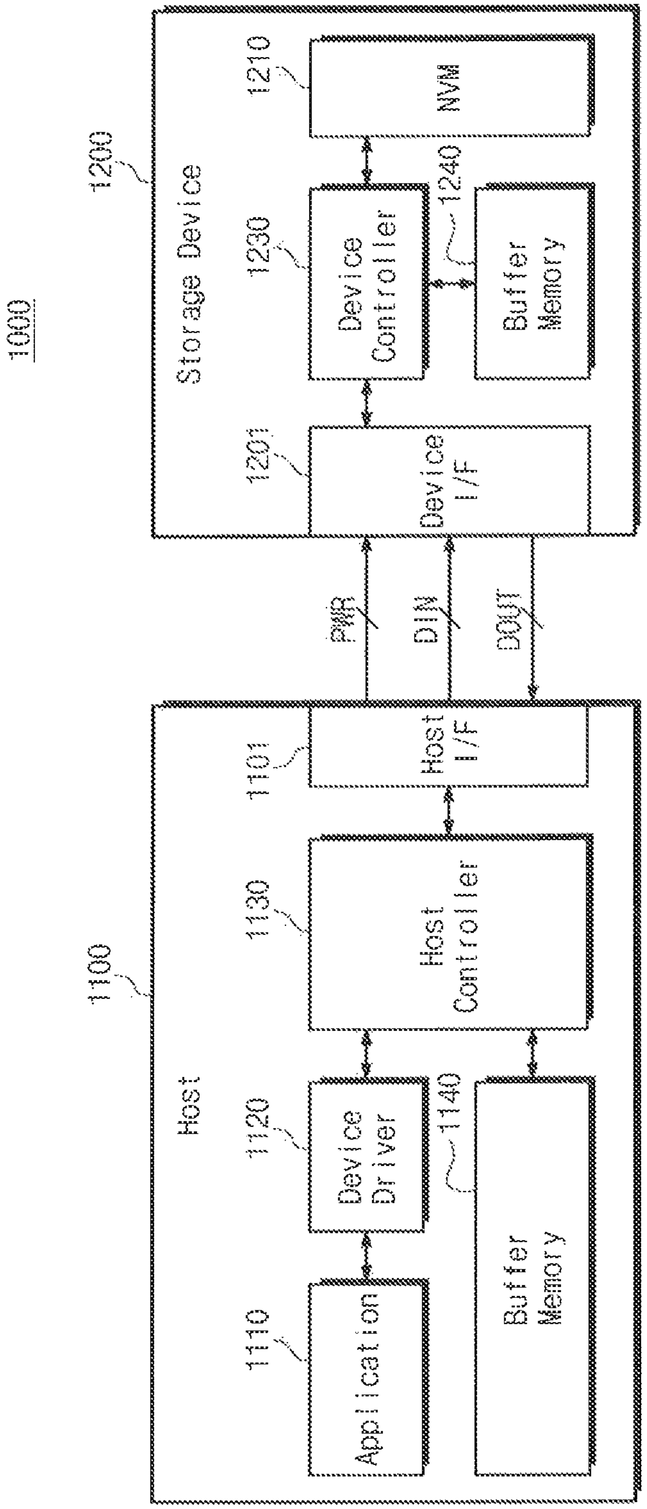
FIG. 1 is a block diagram illustrating a storage system according to an exemplary embodiment of the inventive concept.

Hereinafter, exemplary embodiments of the inventive concept will be described in detail with reference to the accompanying drawings. The inventive concept, however, may be embodied in various different forms, and should not be construed as being limited only to the illustrated embodiments. Like reference numerals may denote like elements throughout the attached drawings and written description, and thus descriptions may not be repeated. In the drawings, the sizes and relative sizes of layers and regions may be exaggerated for clarity.

As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram illustrating a storage system according to an exemplary embodiment of the inventive concept. Referring to FIG. 1, a storage system 1000 includes a host 1100 and a storage device 1200. The host 1100 includes a host interface 1101 and the storage device 1200 includes a device interface 1201.

The host interface 1101 and the device interface 1201 are connected through data lines DIN and DOUT for exchanging data and signals and a power line PWR for providing a power. The host interface 1101 and the device interface 1201 are connected through various interfaces such as a Universal Flash Storage (UFS) interface, a Serial Advanced Technology Attachment (SATA) interface, a Small Computer Small Interface (SCSI), a Serial Attached SCSI (SAS), an embedded Multi Media Card (eMMC) interface, etc.

The host 1100 further includes an application 1110, a device driver 1120, a host controller 1130, and a buffer memory 1140. The application 1110 may include application programs executed on the host 1100. The device driver 1120 drives peripheral devices connected to the host 1100. For example, the device driver 1120 may drive the storage device 1200. The application 1110 and the device driver 1120 may be implemented by software or firmware.

The host controller 1130 may control internal operations of the host 1100. For example, the host controller 1130 provides data stored in the buffer memory 1140 to the storage device 1200 through the host interface 1101 in response to a write request of the device driver 1120. When receiving a read request, the host controller 1130 issues a read command to the storage device 1200 through the host interface 1101 and fetches data from the storage device 1200.

The buffer memory 1140 may be used as a main memory or a cache memory of the host 1100 or as a memory to temporarily store data to be provided to the storage device 1200. In addition, the buffer memory 1140 may be used as a driving memory for driving software such as the application 1100, the device driver 1120, etc.

The storage device 1200 is connected to the host 1100 through the device interface 1201. The storage device 1200 includes a nonvolatile memory 1210, a device controller 1230, and a buffer memory 1240.

The nonvolatile memory 1210 may include a flash memory, a Magnetic Random Access Memory (MRAM), a Phase change RAM (PRAM), a Ferroelectric RAM (FRAM, F-RAM, or FeRAM), etc. The device controller 1230 controls an overall operation of the nonvolatile memory 1210 including a write operation, a read operation, an erase operation, etc. The device controller 1230 exchange data with the nonvolatile memory 1210 or the buffer memory 1240 through an address or data bus.

The buffer memory 1240 is used to temporarily store data to be stored in the nonvolatile memory 1210 or data read from the nonvolatile memory 1210. The buffer memory 1240, for example, may be formed of a volatile memory, a nonvolatile memory, or a combination of the volatile and nonvolatile memories.

The storage system 1000 illustrated in FIG. 1 consumes a lot of power at an interface portion where the host 1100 and the storage device 1200 are interconnected. In particular, when mass data such as a moving picture, etc. is transferred between the host 1100 and the storage device 1200 at a high speed, a lot of power is consumed at the interface portion. The storage system 1000 may be a mobile device.

Figure 2:
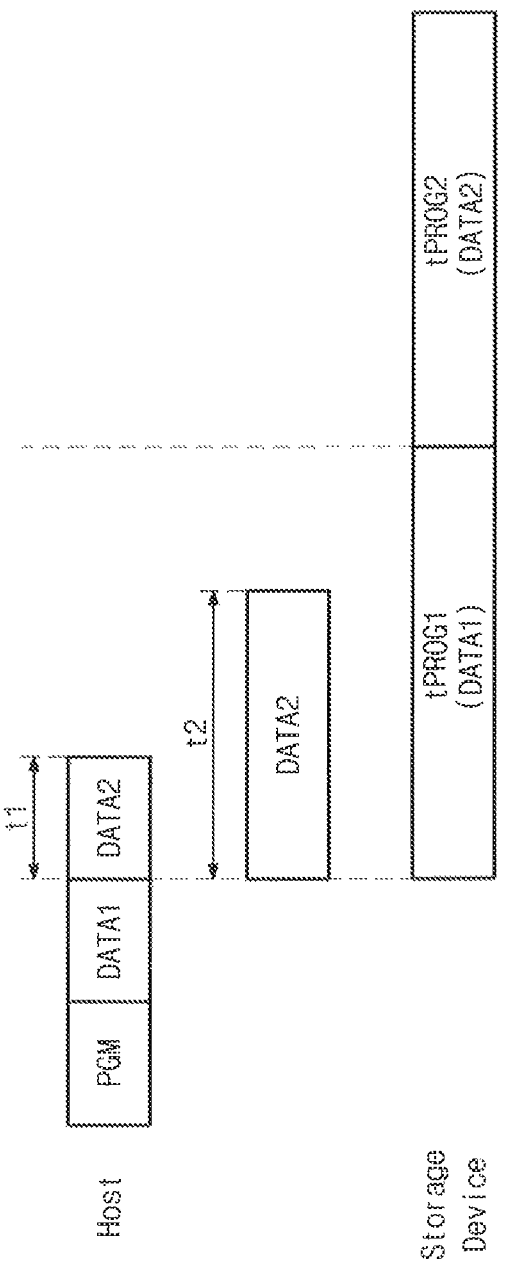
FIG. 2 is a timing diagram illustrating a program procedure of a storage system illustrated in FIG. 1, according to an exemplary embodiment of the inventive concept.

FIG. 2 is a timing diagram illustrating a program procedure of a storage system illustrated in FIG. 1, according to an exemplary embodiment of the inventive concept. Referring to FIG. 2, a host 1100 (refer to FIG. 1) provides a program command PGM and first and second data DATA1 and DATA2 to a storage device 1200 (refer to FIG. 1). The storage device 1200 performs a program operation for the first and second data DATA1 and DATA2 in response to the program command PGM. The first data DATA1 is programmed during a first program time tPROG1 and the second data DATA2 is programmed during a second program time tPROG2.

Referring to FIGS. 1 and 2, the host 1100 sends the first data DATA1 and the storage device 1200 temporarily stores the first data DATA1 in the buffer memory 1240 (refer to FIG. 1). The storage device 1200 programs the first data temporarily stored in the buffer memory 1240 at a nonvolatile memory 1210 (refer to FIG. 1). The nonvolatile memory 1210 programs the first data DATA1 during the first program time tPROG1, for example.

After the programming of the first data DATA1 ends, the storage device 1200 performs a program operation for the second data DATA2. The storage device 1200 programs the second data DATA2 temporarily stored in the buffer memory 1240 at the nonvolatile memory 1210. The nonvolatile memory 1210 programs the second data DATA2 during the second program time tPROG2, for example.

As illustrated in FIG. 2, if the host 1100 sends the first data DATA1, the nonvolatile memory 1210 programs the first data DATA1. The host 1100 provides the second data DATA2 to the storage device 1200 during the programming of the first data DATA1 in the nonvolatile memory 1210.

Referring to FIG. 2, the program time tPROG1 when the nonvolatile memory 1210 programs the first data DATA1 is longer than a time t1 when the host 1100 sends the second data DATA2. A time taken for the host 1100 to transfer the second data DATA2 is changed from t1 to t2. In this case, since the second data DATA2 is transferred during an idle time in the first program time tPROG1, a performance of the storage system 1000 may not be influenced. The storage system 1000 reduces a peak power by lengthening a data transfer time. Thus, it is possible to reduce heat and power consumption.

A trade-off may exist between a data transfer speed and a peak power. For example, the peak power increases when the data transfer speed is fast and decreases when the data transfer speed is slow. In FIG. 2, there is illustrated an example where a second transfer time t2 of the second data DATA2 is longer than a first transfer time t1. A peak power and heat are reduced by changing a transfer time of the second data DATA2 from the first transfer time t1 to the second transfer time t2.

Figure 3:
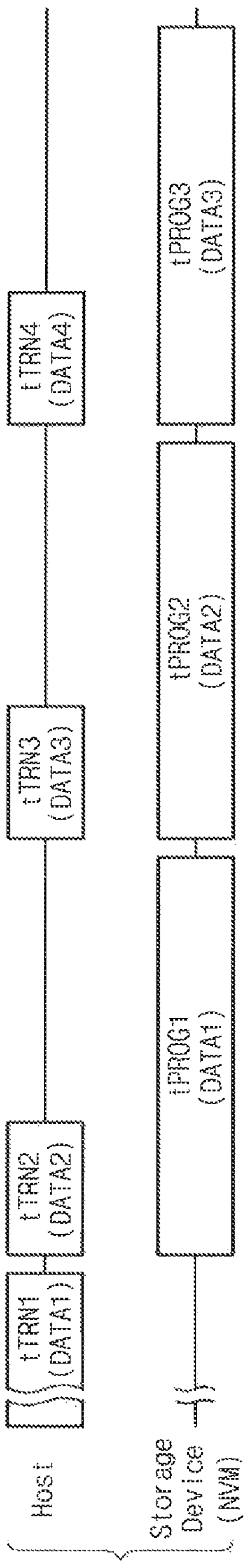
FIGS. 3 to 5 are timing diagrams illustrating a reduction of a peak power when a data transfer speed is slow, according to an exemplary embodiment of the inventive concept.
Figure 4:
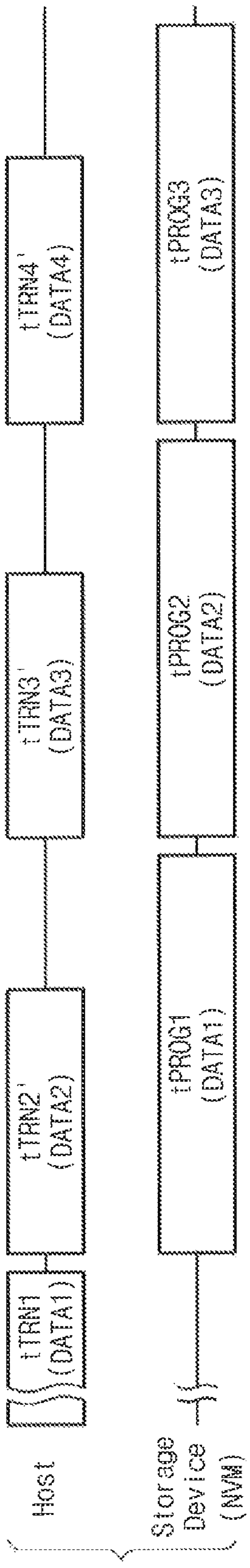
Figure 5:
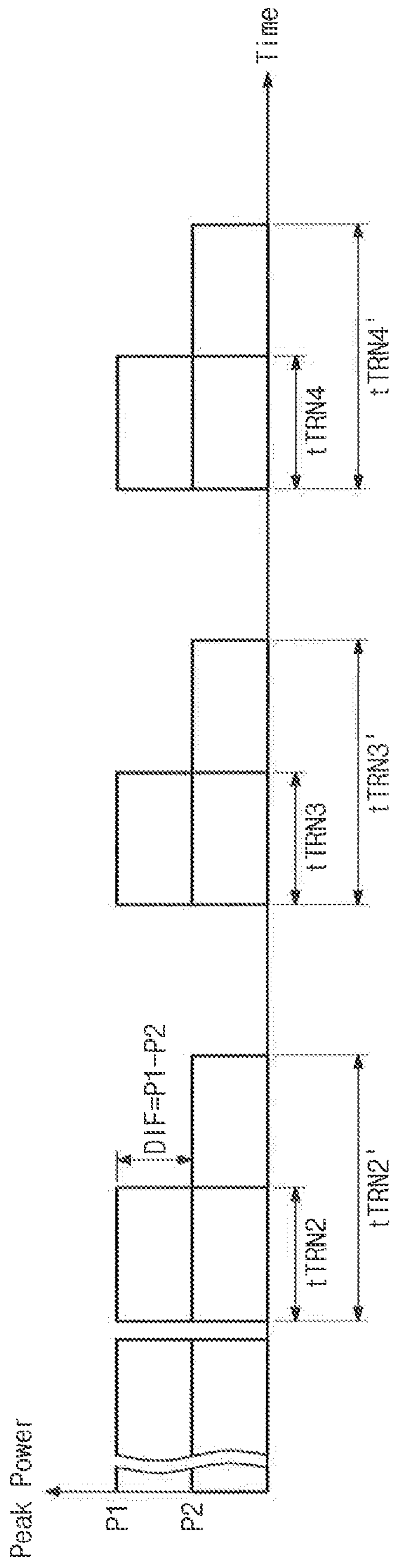

FIGS. 3 to 5 are timing diagrams illustrating a reduction of a peak power when a data transfer speed is slow, according to an exemplary embodiment of the inventive concept. A data transfer speed illustrated in FIG. 4 is longer than that illustrated in FIG. 3. For example, in FIG. 3, there is illustrated an embodiment where data is transferred at a high speed. In FIG. 4, there is illustrated an embodiment where data is transferred at a low speed.

Referring to FIG. 3, a host 1100 (refer to FIG. 1) sends first data DATA1 during a first transfer time tTRN1. If a transfer of the first data DATA1 ends, a storage device 1200 (refer to FIG. 1) programs the first data DATA1 in a nonvolatile memory 1210 (refer to FIG. 1). The nonvolatile memory 1210 performs a program operation with the first data DATA1 during a first program time tPROG1.

While the nonvolatile memory 1210 is programming the first data DATA1, the host 1100 transfers second data DATA2 during a second transfer time tTRN2. In the same manner as described above, the host 1100 transfers third data DATA3 during a third transfer time tTRN3 and transfers fourth data DATA4 during a fourth transfer time tTRN4. The nonvolatile memory 1210 performs a program operation with the second data DATA2 during a second program time tPROG2 and performs a program operation with the third data DATA3 during a third program time tPROG3.

Referring to FIG. 4, the host 1100 sends the first data DATA1 during the first transfer time tTRN1 and the second data DATA2 during a second transfer time tTRN2'. The second transfer time tTRN2' illustrated in FIG. 4 is longer than the second transfer time tTRN2 illustrated in FIG. 3. In other words, as compared to a case where the host 1100 illustrated in FIG. 3 sends the second data DATA2, the host 1100 illustrated in FIG. 4 sends the second data DATA2 relatively slowly. Likewise, third and fourth transfer times tTRN3' and tTRN4' illustrated in FIG. 4 are longer than the third and fourth transfer times tTRN3 and tTRN4 illustrated in FIG. 3.

Referring to FIG. 5, a peak power P2 generated during the second transfer time tTRN2' is less than that generated during the second transfer time tTRN2. The peak power is lowered when a data transfer time lengthens or a data transfer speed is slower. It is understood from FIG. 5 that a peak power is reduced by DIF (=P1−P2).

Returning to FIG. 1, the storage system 1000 according to an exemplary embodiment of the inventive concept reduce heat and power consumption by slowing a data transfer speed from the host 1100 to the storage device 1200 while data is being programmed in the nonvolatile memory 1210 of the storage device 1200.

In addition, the storage system 1000 according to an exemplary embodiment of the inventive concept may reduce power consumption by changing a data transfer speed to be suitable for an actual data transfer amount, not just the maximum transfer speed of the host 1100 and the storage device 1200.

Figure 6:
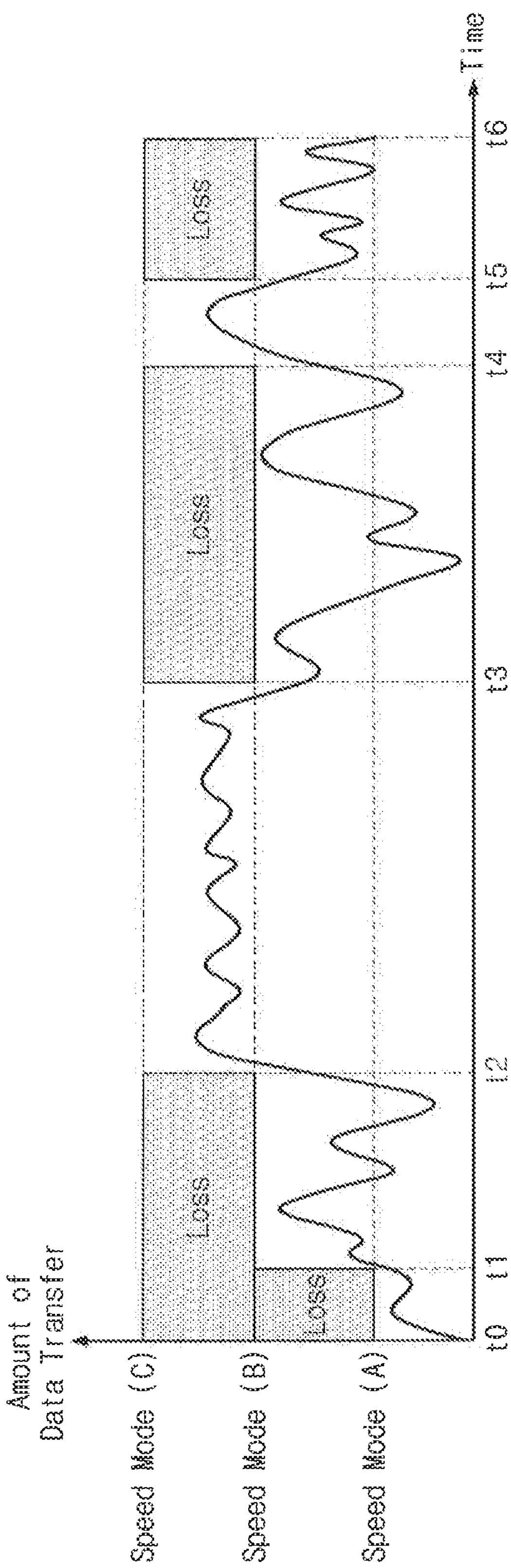
FIG. 6 is a graph showing an amount of data transfer over time, according to an exemplary embodiment of the inventive concept.

FIG. 6 is a graph showing an amount of data transfer over time, according to an exemplary embodiment of the inventive concept. Referring to FIG. 6, a speed mode may be divided into multiple sections according to the amount of data transferred per unit time. For example, the speed mode may be divided into a first speed mode A, a second speed mode B, and a third speed mode C.

Referring to FIG. 1, when data is transferred between the host 1100 and the storage device 1200, the storage system 1000 sets a speed mode to the maximum speed mode. Referring to FIG. 6, the storage system 1000 sends data using the third speed mode C during the time t0 to t6. In this case, if the amount of data transfer is smaller than that of the third speed mode C, a loss on a data transfer bandwidth of the storage system 1000 arises.

As illustrated in FIG. 6, it is possible to transfer data by setting a speed mode to the first speed mode A during a time section between t0 and t1. However, during a time section between t0 and t1, a speed mode is set to the third speed mode C, not the first speed mode A. Likewise, during the time sections between t1 and t2, t3 and t4, and t5 and t6, a speed mode is set to the third speed mode C, not the second speed mode B. Since the storage system 1000 is set to the third speed mode C over all time sections, a loss on the data transfer bandwidth arises in areas corresponding to boxes shaded in gray and labeled “Loss”. Thus, a power is unnecessarily consumed.

The storage system 1000 illustrated in FIG. 1, however, is able to set a speed mode to be suitable for an actual data transfer amount, not just the maximum speed mode. Referring to FIG. 6, the storage system 1000, for example, sets a speed mode to the first speed mode A during the time section between t0 and t1, to the second speed mode B during the time section between t1 and t2, and to the third speed mode C during the time section between t2 and t3. In addition, the storage system 1000 sets the speed mode to the second speed mode B during the time sections between t3 and t4 and t5 and t6 and to the third speed mode C during a time section between t4 and t5.

The storage system 1000 according to an exemplary embodiment of the inventive concept may reduce power consumption by changing a data transfer speed to be suitable for an actual data transfer amount, not just the maximum transfer speed of the host 1100 and the storage device 1200.

Below, there are described various exemplary embodiments of the inventive concept in which a storage system is configured to change a speed mode to be suitable for an actual data transfer amount. In particular, there is described a UFS system that is based on a flash memory and is used for a mobile device such as a smart phone.

Figure 7:
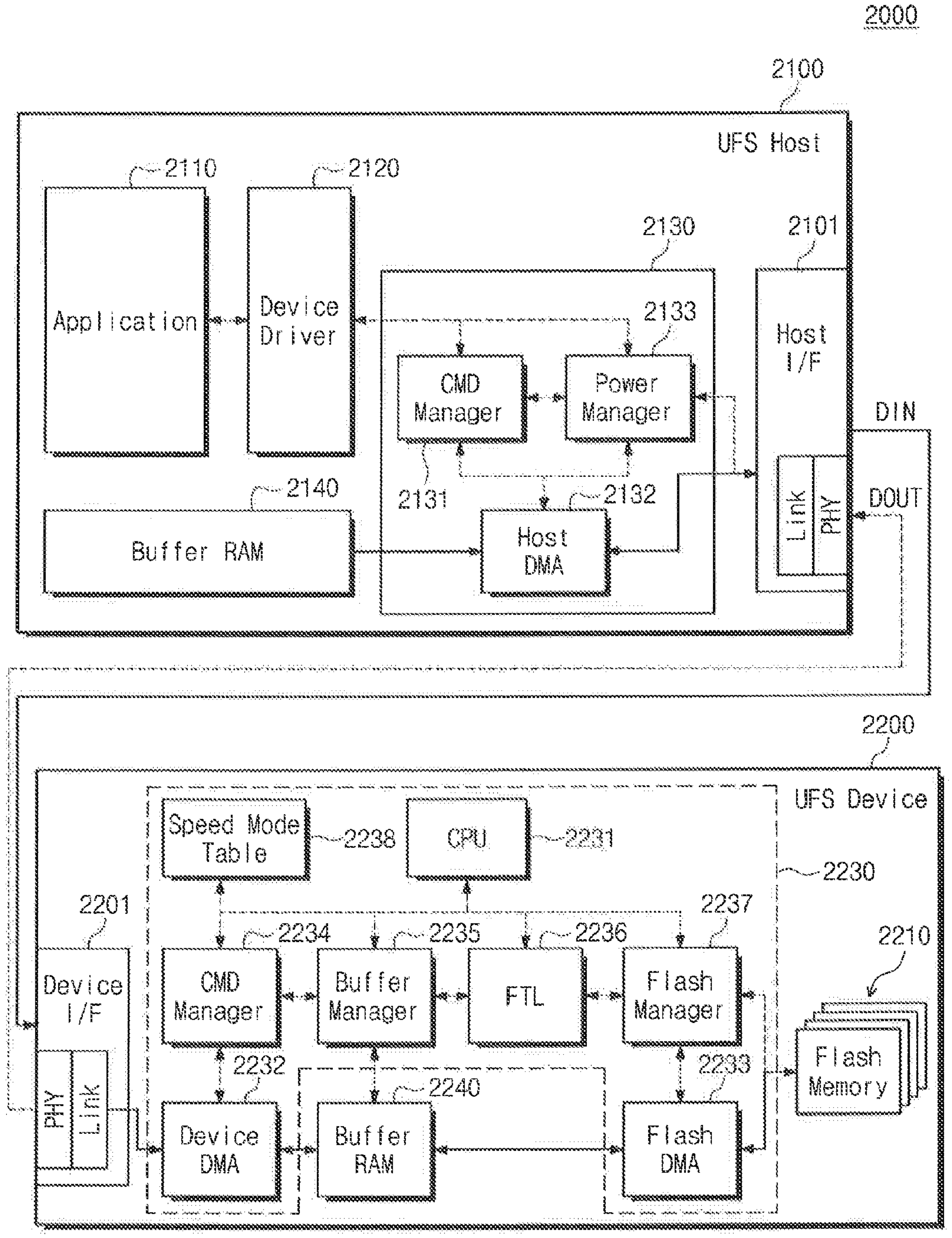
FIG. 7 is a block diagram illustrating a Universal Flash Storage (UFS) system according to an exemplary embodiment of the inventive concept.

FIG. 7 is a block diagram illustrating a UFS system according to an exemplary embodiment of the inventive concept. Referring to FIG. 7, a UFS system 2000 includes a UFS host 2100 and a UFS device 2200.

The UFS host 2100 includes an application 2110, a device driver 2120, a host controller 2130, and a buffer RAM 2140. The host controller 2130 includes a command manager 2131, a host DMA 2132 (DMA may stand for direct memory access), and a power manager 2133.

A command (e.g., a write command) generated by the application 2110 and the device driver 2120 in the UFS host 2100 is provided to the command manager 2131 of the host controller 2130. The command manager 2131 generates a protocol or a command to be provided to the UFS device 2200 using a command provided from the device driver 2120. The command generated by the command manager 2131 is provided to the host DMA 2132. The host DMA 2132 sends the command to the UFS device 2200 through a host interface 2101. The host interface 2101 includes a physical layer and a data link layer.

The UFS device 2200 includes a flash memory 2210, a device controller 2230, and a buffer RAM 2240. The device controller 2230 includes a Central Processing Unit (CPU) 2231, a device DMA 2232, a flash DMA 2233, a command manager 2234, a buffer manager 2235, a flash translation layer 2236, a flash manager 2237, and a speed mode table 2238.

A command transferred from the UFS host 2100 to the UFS device 2200 is provided to the device DMA 2232 through a device interface 2201. The device interface 2201 includes a physical layer and a data link layer. The device DMA 2232 transfers the input command to the command manager 2234. The command manager 2234 allocates the buffer RAM 2240 to receive data through the buffer manager 2235.

If it is ready to transfer data, the command manager 2234 sends a READY_TO_TRANSFER (RTT) UFS Protocol Information Unit (UPIU) to the UFS host 2100.

The UFS host 2100 sends data to the UFS device 2200 in response to the RTT UPIU. The data is sent to the UFS device 2200 through the host DMA 2132 and the host interface 2101. The UFS device 2200 stores the received data in the buffer RAM 2240 through the device DMA 2232 and the buffer manager 2235. The data stored in the buffer RAM 2240 is provided to the flash manger 2237 through the flash DMA 2233. The flash manager 2237 stores data at an address of the flash memory 2210 based on an address mapping table of the flash translation layer 2236.

If a data transfer for a command and programming are completed, the UFS device 2200 sends a response to the UFS host 2100 through an interface, and informs the UFS host 2100 that the command is completed. The UFS host 2100 informs the device driver 2120 and the application 2110 whether the command is completed, based on the response signal, and terminates an operation corresponding to the command.

The UFS system 2000 illustrated in FIG. 7 changes a speed mode to be suitable for an actual data transfer amount. The UFS device 2200 calculates a transfer amount of data provided to the device DMA 2232 and searches for an optimal speed mode and an efficient transfer speed using the speed mode table 2238. The UFS device 2200 provides the UFS host 2100 with the efficient transfer speed. The UFS host 2100 changes a speed mode of an interface to be suitable for the efficient transfer speed.

Figure 8:
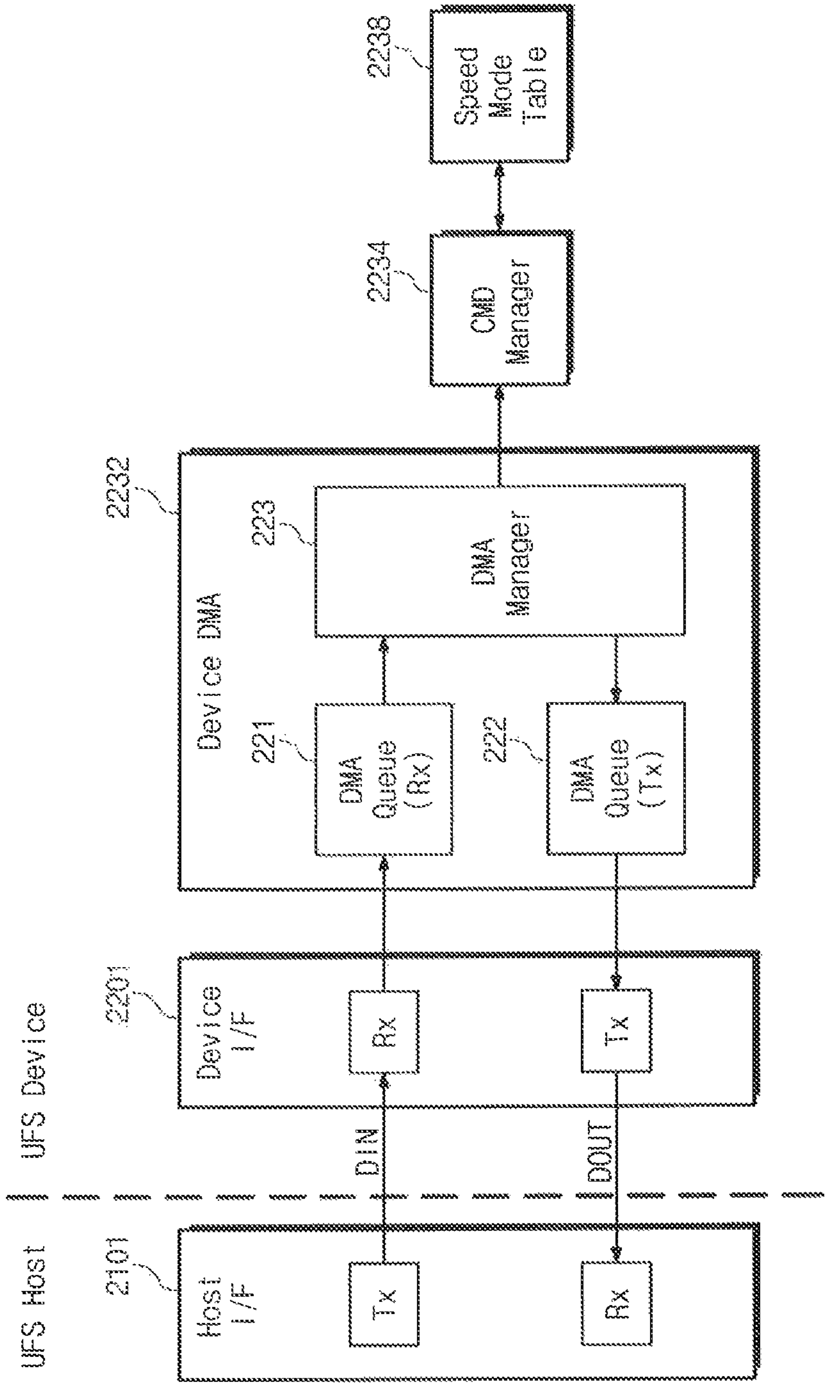
FIGS. 8 to 10 are block diagrams illustrating methods in which a UFS device illustrated in FIG. 7 calculates a transfer speed, according to an exemplary embodiment of the inventive concept.
Figures 9, 10:
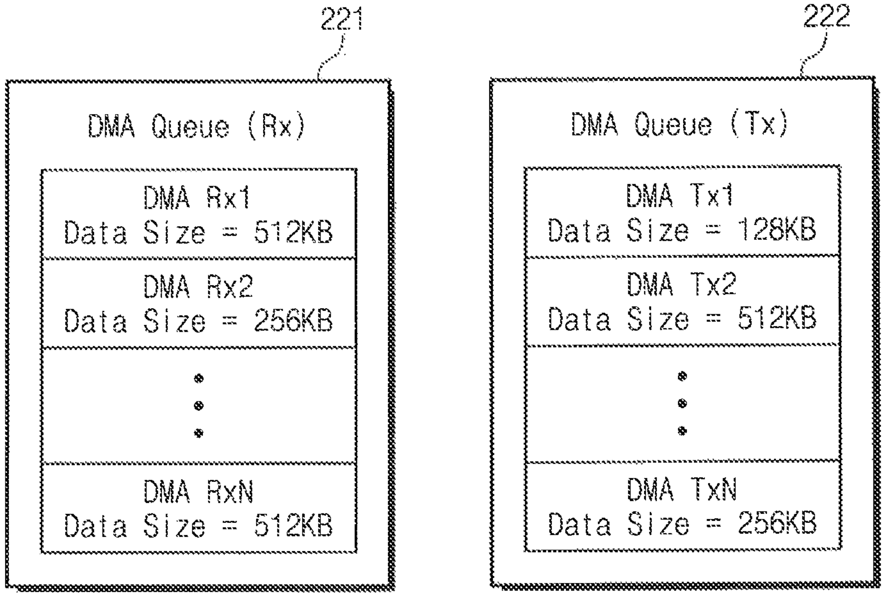

FIGS. 8 to 10 are block diagrams illustrating methods in which the UFS device illustrated in FIG. 7 calculates an efficient transfer speed, according to an exemplary embodiment of the inventive concept.

Referring to FIG. 8, a device DMA 2232 includes a reception DMA queue 221, a transmission DMA queue 222, and a DMA manager 223.

The reception DMA queue 221 sequentially stores size information of data input through a transmission unit Tx of a host interface 2101 and a reception unit Rx of a device interface 2201. As illustrated in FIG. 9, size information of data DMA Rx1 to DMA RxN may be stored in the reception DMA queue 221. For example, DMA Rx1 has a data size of 512 KB, DMA Rx2 has a data size of 256 KB, and DMA RxN has a data size of 512 KB.

The transmission DMA queue 222 sequentially stores size information of data to be transferred to a reception unit Rx of the host interface 2101 from a transmission unit Tx of the device interface 2201. As illustrated in FIG. 9, size information of data DMA Tx1 to DMA TxN may be stored in the transmission DMA queue 222. For example, DMA Tx1 has a data size of 128 KB, DMA Tx2 has a data size of 512 KB, and DMA TxN has a data size of 256 KB.

The DMA manager 223 sums sizes of the data DMA Rx1 to DMA RxN stored in the reception DMA queue 221 to calculate a total amount of data received. Likewise, the DMA manager 223 sums sizes of the data DMA Tx1 to DMA TxN stored in the transmission DMA queue 222 to calculate a total amount of data to be transmitted. The DMA manager 223 provides a command manger 2234 with a total amount of data received and a total amount of data to be transmitted.

The command manager 2234 determines an optimal speed mode and an efficient speed mode based on information associated with a total amount of data provided from the device DMA 2232 and a speed mode table 2238 (refer to FIG. 7 or FIG. 10).

FIG. 10 is a table illustrating a speed mode table illustrated in FIG. 7, according to an exemplary embodiment of the inventive concept. Referring to FIG. 10, a speed mode and an efficient transfer speed are recorded in a speed mode table 2238. For example, if a total amount of data received or a total amount of data to be transmitted is less than 128 MB, the speed mode is set to a first speed mode A and the efficient transfer speed is set to 1.5 Gbps. When a total amount of data received or a total amount of data to be transmitted is between 128 MB and 256 MB, the speed mode is set to a second speed mode B and the efficient transfer speed is set to 3 Gbps. In the event that a total amount of data received or a total amount of data to be transmitted is between 256 MB and 512 MB, the speed mode is set to a third speed mode C and the efficient transfer speed is set to 6 Gbps.

Returning to FIG. 7, the UFS device 2200 provides the UFS host 2100 with the efficient transfer speed calculated using a total data amount. For example, the command manager 2234 of the device controller 2230 provides the efficient transfer speed to the host controller 2130 using the RTT UPIU, a DATA IN UPIU, a RESPONSE UPIU, etc. Whenever the device controller 2230 transfers the RTT UPIU, DATA IN UPIU, RESPONSE UPIU, etc., it sends the efficient transfer speed. Power consumption and a loss of a data transfer bandwidth are reduced in proportion to an increase in a frequency by which the efficient transfer speed is transmitted.

The host DMA 2132 of the host controller 2130 provides the command manager 2131 with the input RTT UPIU, DATA IN UPIU, or RESPONSE UPIU including the efficient transfer speed. The command manager 2131 parses the RTT UPIU, DATA IN UPIU, or RESPONSE UPIU to decide the efficient transfer speed. The command manager 2131 sends the efficient transfer speed to the device driver 2120.

The device driver 2120 issues a speed mode change command to the host controller 2130 based on the efficient transfer speed. The host controller 2130 changes a data transfer speed of the host interface 2101 and the device interface 2201 in response to the speed mode change command.

Figure 11:
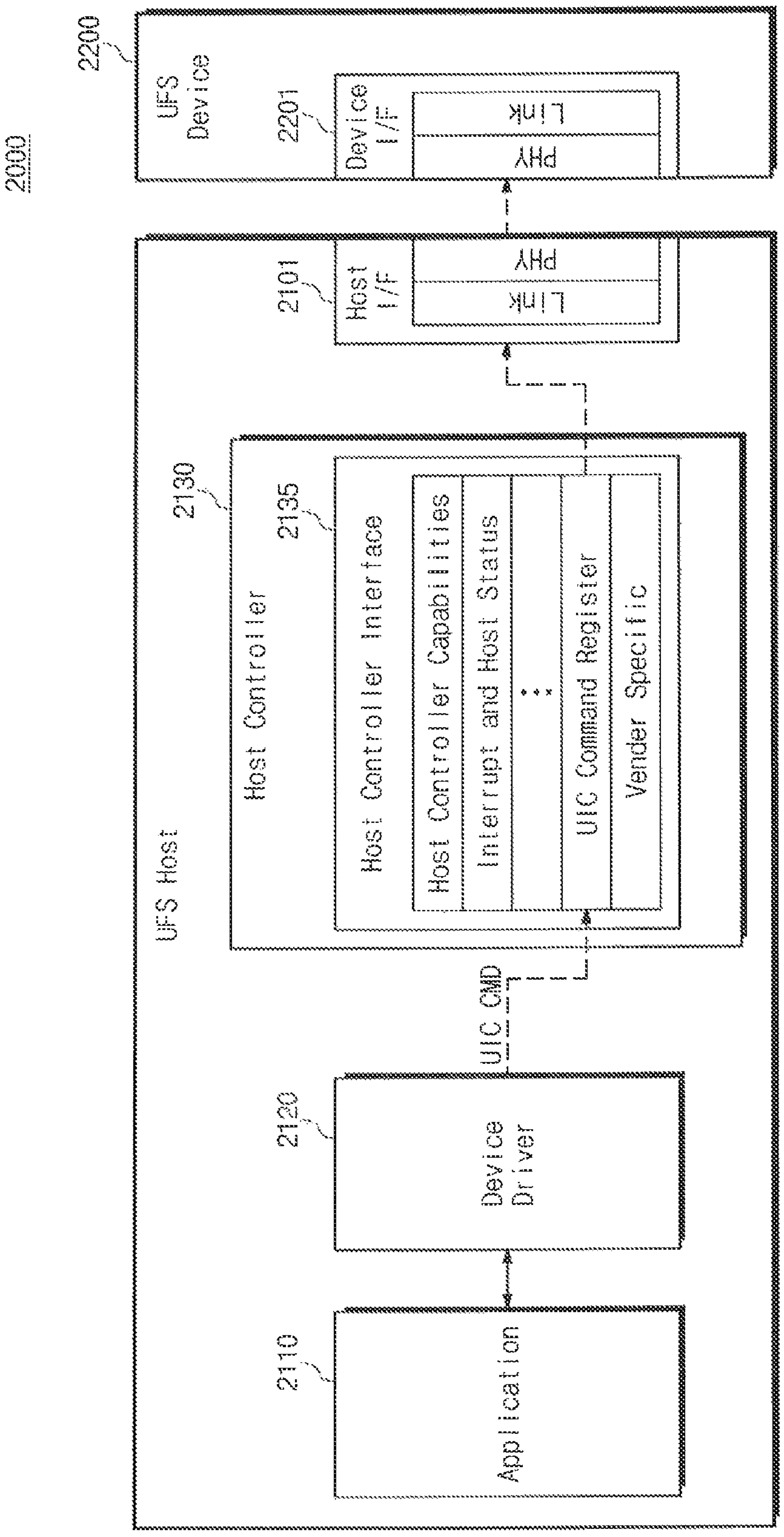
FIG. 11 is a block diagram for describing a method in which a UFS host illustrated in FIG. 7 changes a data transfer speed, according to an exemplary embodiment of the inventive concept.

FIG. 11 is a block diagram for describing a method in which the UFS host illustrated in FIG. 7 changes a data transfer speed, according to an exemplary embodiment of the inventive concept. Referring to FIG. 11, a device driver 2120 provides a UFS interconnect layer command UIC CMD to a Host Controller Interface (HCl) 2135. The UFS interconnect layer command UIC CMD includes a command for changing a speed mode of an interface. The HCl 2135 includes Host Controller Capabilities, Interrupt and Host Status, . . . , UIC Command Register, and Vender Specific information.

The UFS interconnect layer command UIC CMD is provided to the UIC command register. A host controller 2130 may change a data transfer speed by setting UIC attributes. The host controller 2130 changes data transfer speeds of host and device interfaces 2101 and 2201 to an efficient transfer speed by setting the UIC command register.

The host interface 2101 and the device interface 2201 include a link layer and a physical layer as the UFS interconnect layer (UIC). The link layer may be called "MIPI UniPro", and checks whether data or signals received through the physical layer are valid. If invalid, the link layer again requests data to the UFS host 2100 or the UFS device 2200. If valid, the link layer sends acknowledge ACK. The physical layer may be called "MIPI M-PHY" and includes a transmission unit Tx and a reception unit Rx.

Figure 12:
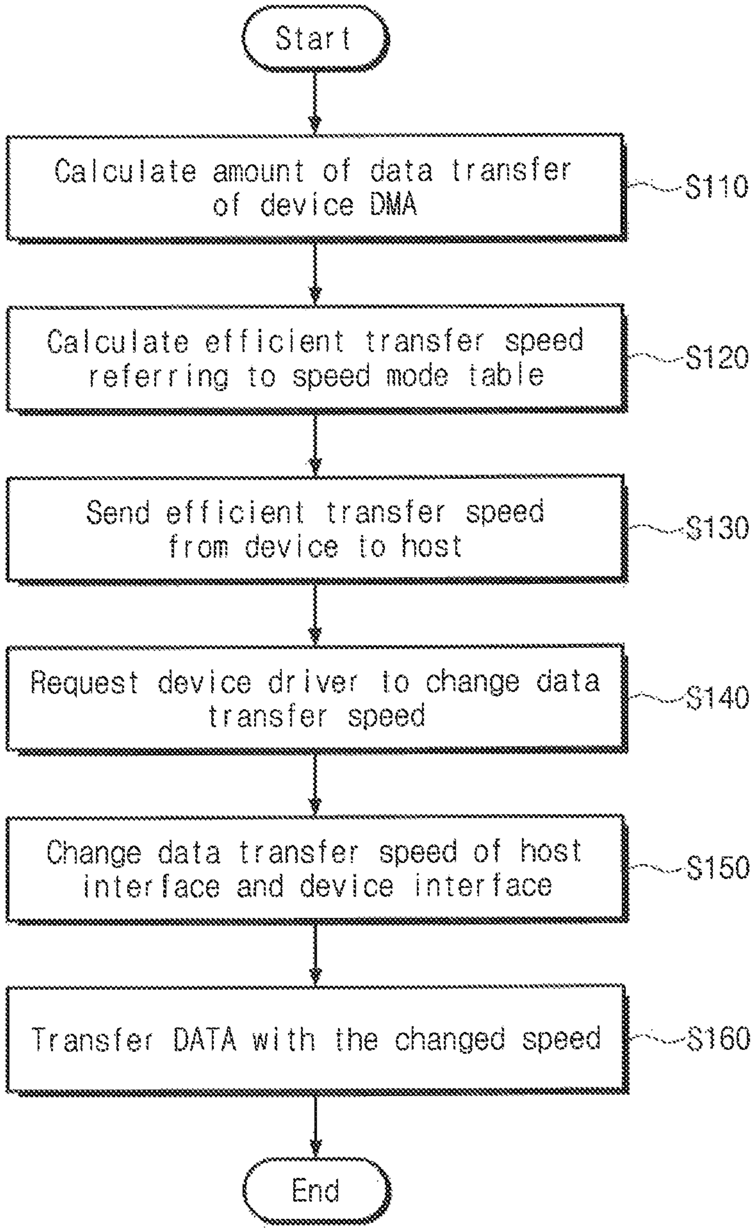
FIG. 12 is a flow chart illustrating a data transfer speed changing method of a storage system according to an exemplary embodiment of the inventive concept.

FIG. 12 is a flow chart illustrating a data transfer speed changing method of a storage system according to an exemplary embodiment of the inventive concept. Below, a data transfer speed changing method of the UFS system 2000 illustrated in FIG. 7 is described.

In step S110, there is calculated a total data amount of the device DMA 2232. Referring to FIG. 8, the DMA manager 223 sums sizes of data stored in the reception and transmission DMA queues 221 and 222 to calculate a total amount of data received and a total amount of data to be transmitted. The DMA manager 223 provides the command manger 2234 with information associated with the total amount of data received and the total amount of data to be transmitted.

In step S120, an efficient transfer speed is calculated based on the speed mode table 2238. Referring to FIG. 8, the command manager 2234 determines an efficient transfer speed based on information associated with the total amount of data provided from the device DMA 2232 and the speed mode table 2238.

In step S130, information about the efficient transfer speed is sent from the UFS device 2200 to the UFS host 2100. The UFS device 2200 provides the information about the efficient transfer speed to the UFS host 2100 using the RTT UPIU or DATA IN UPIU.

In step S140, the UFS host 2100 requests the device driver 2120 to change a data transfer speed to the efficient transfer speed provided from the UFS device 2200.

In step S150, the device driver 2120 issues a command, informing a change of a data transfer speed of the host and device interfaces 2101 and 2201, to the host controller 2130. The host controller 2130 changes the data transfer speeds of the interfaces 2101 and 2201 according to the speed change command.

In step S160, data is exchanged between the UFS host 2100 and the UFS device 2200 according to the changed speed.

The UFS system 2000 illustrated in FIG. 7 changes speed modes of the host and device interfaces 2101 and 2201 based on the amount of data transfer calculated by the UFS device 2200. Thus, it is possible to reduce a loss of a data transfer bandwidth and reduce power consumption by changing a speed mode to be suitable for an actual data transfer amount, not just the maximum speed mode.

Figure 13:
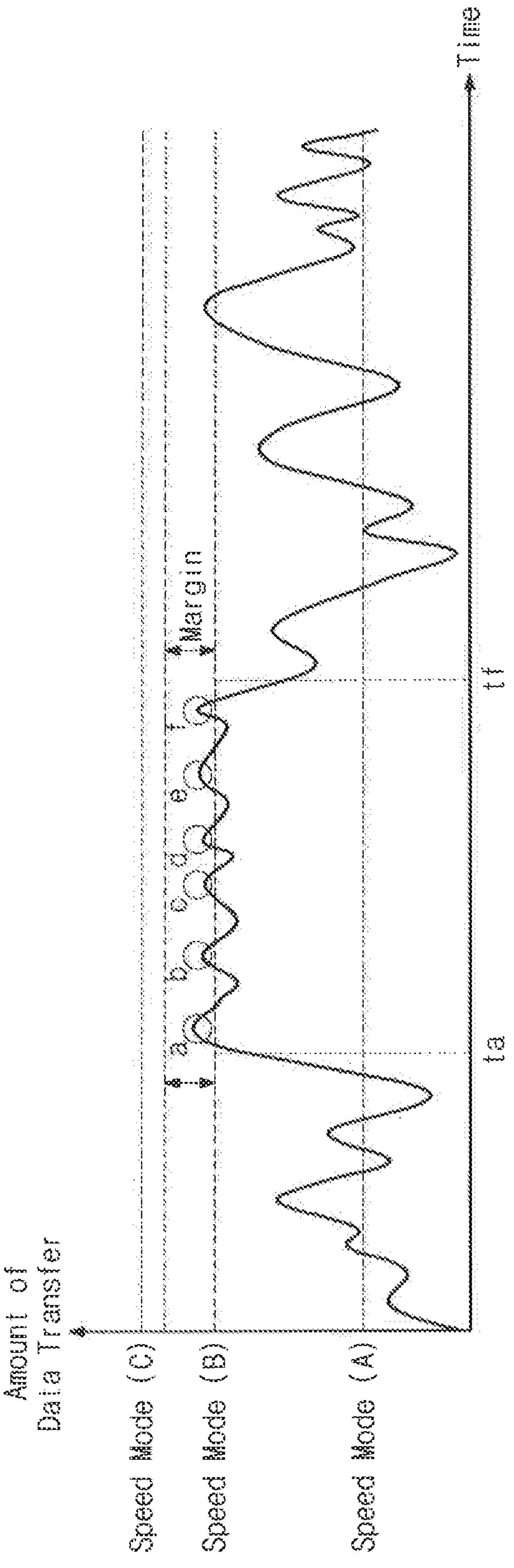
FIG. 13 is a graph illustrating an amount of data transfer over time, according to an exemplary embodiment of the inventive concept.

FIG. 13 is a graph illustrating an amount of data transfer over a time, according to an exemplary embodiment of the inventive concept. In FIG. 13, there is illustrated an embodiment where a speed mode is frequently changed. As described above, a storage system 1000 (refer to FIG. 1) according to an exemplary embodiment of the inventive concept changes a speed mode to be suitable for an actual data transfer amount, not just the maximum speed mode.

Referring to FIG. 13, a storage system 1000 according to an exemplary embodiment of the inventive concept may change a speed mode frequently during a time section between ta to tf. In FIG. 13, a to f indicate that a speed mode is changed from a second speed mode B to a third speed mode C. If the amount of data transfer is frequently varied at a speed mode boundary, a performance of the storage system 1000 is lowered due to a frequent change of the speed mode.

Performance of the storage system 1000 may not be lowered due to a frequent change of the speed mode, by changing a speed mode based on a margin. Referring to FIG. 13, the storage system 1000 changes a speed mode from the second speed mode B to the third speed mode C when the amount of data transfer exceeds the margin.

In addition, the storage system 1000 according to an exemplary embodiment of the inventive concept may change a speed mode when changed N times. For example, when a speed mode is changed three times, the storage system 1000 changes the speed mode to the third speed mode C. In this case, the speed mode is changed to the third speed mode C at a time point d illustrated in FIG. 13. Thus, performance of the storage system 1000 may not be lowered due to a frequent change of the speed mode.

Figure 14:
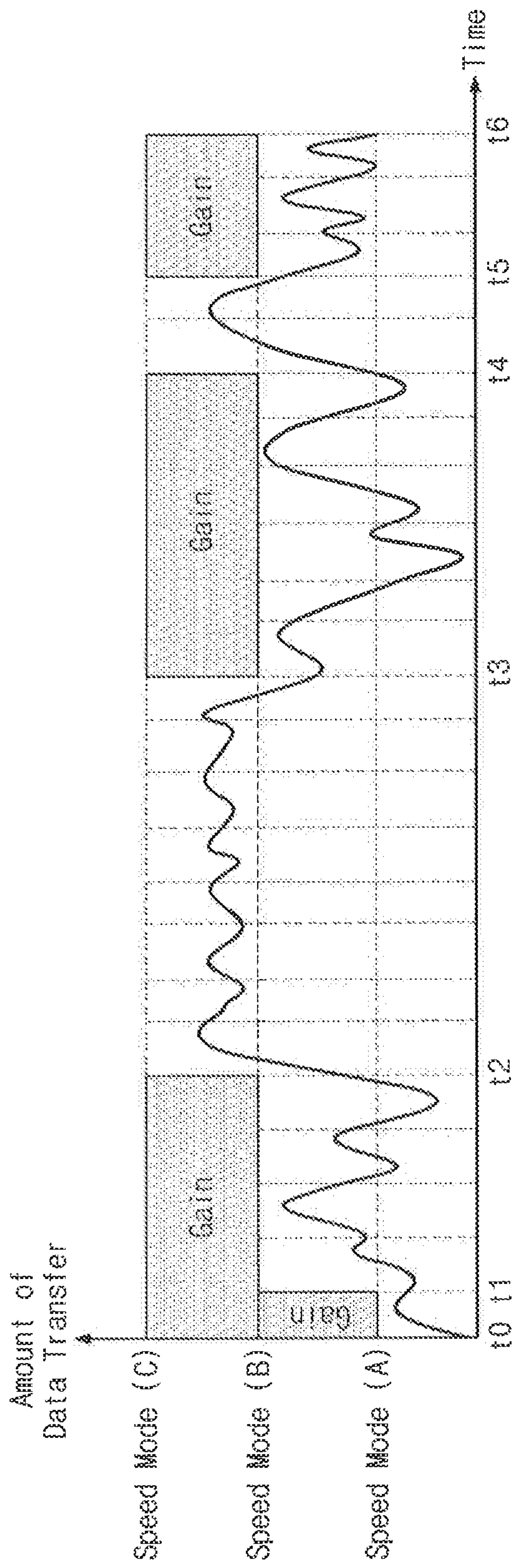
FIG. 14 is a graph illustrating a gain of a data transfer bandwidth of a storage system according to an exemplary embodiment of the inventive concept.

FIG. 14 is a graph illustrating a gain of a data transfer bandwidth of a storage system according to an exemplary embodiment of the inventive concept.

Referring to FIG. 14, a speed mode is set to a first speed mode A during a time section between t0 and t1 and to a second speed mode B during time sections between t1 and t2, t3 and t4 and t5 and t6. Since the speed mode of the storage system 1000 is not set to a third speed mode C over the entire section between t0 and t6, a gain of a data transfer bandwidth is obtained in areas marked by boxes shaded in grey and labeled "Gain", and power consumption is reduced.

At the time section between t0 and t1, the speed mode is calculated once. The speed mode is calculated four times during the time section between t1 and t2, eight times during a time section between t2 and t3, six times during the time section between t3 and t4, two times during a time section between t4 and t5, and three times during the time section between t5 and t6. A higher gain of a data transfer bandwidth is obtained by narrowing a time interval when a speed mode is calculated.

A UFS system 2000 according to an exemplary embodiment of the inventive concept may provide information on an efficient transfer speed using a signal that is frequently provided from a UFS device 2200 to a UFS host 2100, to increase a gain of the data transfer bandwidth. For example, the UFS system 2000 illustrated in FIG. 7 increases a gain of the data transfer bandwidth by providing the UFS host 2100 with information on an efficient transfer speed using an RTT UPIU, DATA IN UPIU or RESPONSE UPIU signal rather than a response signal.

A storage system 1000 according to an exemplary embodiment of the inventive concept may change a data transfer speed by changing the number of lanes. Here, a lane may be a unit by which data is independently transferred with a transmission unit Tx and a reception unit Rx. FIG. 8 shows a UFS system connected by a lane.

A storage system 1000 according to an exemplary embodiment of the inventive concept may have a multi-lane structure. When the storage system 1000 sends data through the multiple lanes, the lanes are independently divided to transfer data. The storage system 1000 with a multi-lane structure may reduce power consumption by changing the data transfer speed of a single lane or changing the number of lanes activated.

While the inventive concept has been particularly shown and described with reference to exemplary embodiments thereof, it will be apparent to those of ordinary skill in the art that various changes and modifications may be made thereto without departing from the spirit and scope of the inventive concept as defined by the following claims.

What is claimed is:

1. A storage device of a storage system, comprising:

a device Direct Memory Access (DMA) configured to calculate a data transfer amount based on size information of data provided to a DMA queue from a host;

a command manager configured to receive the data transfer amount from the device DMA and to calculate a transfer speed using a speed mode table; and a device interface configured to transfer the transfer speed to the host, wherein the device DMA calculates an amount of data received using size information of data received through the device interface and calculates an amount of data to be transmitted using size information of data to be transmitted to the host through the device interface, wherein the device DMA comprises:

a reception DMA queue of the DMA queue configured to store the size information of data received through the device interface;

a transmission DMA queue of the DMA queue configured to store the size information of data to be transmitted to the host through the device interface; and a DMA manager configured to calculate an amount of data stored in the reception DMA queue, to calculate an amount of data stored in the transmission DMA queue, and to provide the command manager the amount of data received and the amount of data to be transmitted as the data transfer amount.

2. The storage device of claim 1, wherein the host changes speed modes of an interface of the host and an interface of the storage device in response to the transfer speed.

3. The storage device of claim 1, wherein the command manager changes a speed mode based on a margin of the speed mode when the data transfer amount exceeds the margin.

4. The storage device of claim 1, wherein the command manager changes a speed mode when reaching a predetermined speed mode.

5. A Universal Flash Storage (UFS) system, comprising:

a UFS device including a flash memory; and a UFS host connected to the UFS device through an interface and configured to change a data transfer speed using a transfer speed provided from the UFS device, wherein the UFS device calculates the transfer speed based on a data transfer amount, wherein the interface includes a host interface and a device interface, and the UFS host changes speed modes of the host interface and the device interface in response to the transfer speed, wherein the UFS device provides the UFS host with the transfer speed using a Ready_To_Transfer (RTT) UFS Protocol Information Unit (UPIU), a DATA IN UPIU or a RESPONSE UPIU.

6. The UFS system of claim 5, wherein the UFS device comprises:

a device Direct Memory Access (DMA) configured to calculate the data transfer amount based on size information of data; and a command manager configured to receive the data transfer amount from the device DMA and to calculate the transfer speed using a speed mode table.

7. The UFS system of claim 6, wherein the interface includes a device interface, and the device DMA calculates an amount of data received using size information of data received through the device interface and calculates an amount of data to be transmitted using size information of data to be transmitted to the UFS host through the device interface.

8. The UFS system of claim 7, wherein the device DMA comprises:

a reception DMA queue configured to store the size information of data received through the device interface;

a transmission DMA queue configured to store the size information of data to be transmitted to the UFS host through the device interface; and a DMA manager configured to calculate an amount of data stored in the reception DMA queue, to calculate an amount of data stored in the transmission DMA queue, and to provide the command manager the amount of data received and the amount of data to be transmitted as the data transfer amount.

9. The UFS system of claim 8, wherein the command manager changes a speed mode based on a margin of the speed mode when the data transfer amount exceeds the margin.

10. The UFS system of claim 8, wherein the command manager changes a speed mode when reaching a predetermined speed mode.

11. The UFS system of claim 5, wherein the UFS host comprises:

a host DMA configured to receive the RTT UPIU, DATA IN UPIU or RESPONSE UPIU through the host interface; and a command manager configured to parse the RTT UPIU, DATA IN UPIU or RESPONSE UPIU provided from the host DMA to determine the transfer speed.

12. The UFS system of claim 11, wherein the UFS host further comprises:

a device driver configured to issue a speed mode change command in response to the transfer speed provided from the command manager; and a host controller configured to change speed modes of the host and device interfaces in response to the speed mode change command.

13. A method of changing a data transfer speed of a storage system that includes a host and a storage device, the method comprising:

calculating a data transfer amount based on data size information in the storage device;

receiving the data transfer amount to calculate a transfer speed using a speed mode table;

providing the transfer speed to the host from the storage device;

requesting a device driver to change a data transfer speed of an interface to the transfer speed provided from the storage device; and changing the data transfer speed of the interface in response to a transfer mode change command of the device driver.

14. The method of claim 13, wherein calculating the data transfer amount comprises:

calculating an amount of data received and an amount of data to be transmitted.

15. The method of claim 14, wherein changing the data transfer speed of the interface comprises:

changing a speed mode based on a margin of the speed mode when the data transfer amount exceeds the margin.

16. The method of claim 14, wherein changing the data transfer speed of the interface comprises:

changing a speed mode when reaching a predetermined speed mode.

17. A storage system, comprising:

a first device configured to determine a data transmission amount based on data size information in the first device and determine a data transfer speed by using the data transmission amount and a speed mode table; and a second device configured to receive the data transfer speed from the first device, request a device driver to change a data transfer speed of an interface to the received data transfer speed and change the data transfer speed of the interface in response to a transfer mode change command of the device driver.

18. The storage system of claim 17, wherein the first device is a storage device and the second device is a host.

19. The storage system of claim 17, wherein the interface communicably couples the first device and the second device.

* * * * *